(12) United States Patent  
Gecim et al.

(10) Patent No.: US 7,751,963 B2  
(45) Date of Patent: Jul. 6, 2010

(54) SELF-TUNING ACTIVE ENGINE MOUNT FOR VEHICLES WITH ACTIVE FUEL MANAGEMENT ENGINE

(75) Inventors: Burak A. Gecim, Rochester Hills, MI (US); Joel M. Maguire, Northville, MI (US); Norman K. Bucknor, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 342 days.

(21) Appl. No.: 12/031,005

(22) Filed: Feb. 14, 2008

(65) Prior Publication Data

US 2009/0210139 A1 Aug. 20, 2009

(51) Int. Cl.
- G06F 19/00 (2006.01)
- F02D 17/02 (2006.01)
- F16F 13/04 (2006.01)
- F16F 15/20 (2006.01)

(52) U.S. Cl. ............. 701/111; 267/140.11; 267/140.15; 180/300; 123/192.1

(58) Field of Classification Search ............. 123/192.1; 701/36, 101, 102, 110, 111; 267/140.11, 267/140.13, 140.15, 140.3; 180/300  
See application file for complete search history.

(56) References Cited

U.S. PATENT DOCUMENTS

| | | | |
|---|---|---|---|
| 2,850,116 A * | 9/1958 | Spaetgens | 188/380 |
| 4,060,009 A * | 11/1977 | Wyman | 464/180 |
| 4,657,227 A * | 4/1987 | Hofmann | 267/140.13 |
| 4,671,227 A * | 6/1987 | Hollerweger et al. | 267/140.13 |
| 4,720,084 A * | 1/1988 | Hollerweger et al. | 267/140.13 |
| 5,052,510 A | 10/1991 | Gossman et al. | |
| 5,418,858 A | 5/1995 | Shoureshi | |
| 5,452,884 A | 9/1995 | Gugsch et al. | |
| 5,571,263 A | 11/1996 | Koester et al. | |
| 5,718,418 A | 2/1998 | Gugsch | |
| 5,848,663 A | 12/1998 | Kuriki | |
| 6,374,939 B1 | 4/2002 | Hohnstadt et al. | |
| 6,523,816 B1 * | 2/2003 | Gastineau et al. | 267/140.15 |
| 2008/0185248 A1 * | 8/2008 | Zeid et al. | 267/285 |
| 2009/0037048 A1 * | 2/2009 | Shin | 701/36 |

FOREIGN PATENT DOCUMENTS

| WO | WO8905930 | 6/1989 |
|---|---|---|
| WO | 9427083 A1 | 11/1994 |

OTHER PUBLICATIONS

Lee, Ping; Rahbar, Ali; "Active Tuned Absorber fo Displacement-On-Demand Vehicles", SAE Technical Paper Series 2005-01-2545, May 16, 2005, Warrendale, PA.  
Shoureshi, Rahmat; Bouchillon, Scott; Graf, Peter L.; Knurek, T.; Stevens, R.W.; "Open-Loop Versus Closed-Loop Control for Hydraulic Engine Mounts", SAE 880075, 1988.

* cited by examiner

*Primary Examiner*—Willis R Wolfe, Jr.  
(74) *Attorney, Agent, or Firm*—Quinn Law Group, PLLC

(57) ABSTRACT

An active engine mount assembly for counteracting resultant forces in active fuel management systems, wherein resultant forces are transmitted to a frame of a motorized vehicle generated by the deactivation of at least one cylinder in an internal combustion engine. The active engine mount assembly is fluidly connected to a hydraulic circuit. The hydraulic circuit is operatively connected to an engine crankshaft and operable to actively generate pressure pulses having frequencies self-synchronized with the rotational speed of the crankshaft.

20 Claims, 3 Drawing Sheets

SELF-TUNING ACTIVE ENGINE MOUNT FOR VEHICLES WITH ACTIVE FUEL MANAGEMENT ENGINE

TECHNICAL FIELD

The present invention relates generally to engine mounting systems, and more specifically, to an apparatus and method for counteracting oscillatory forces transmitted to a body of a vehicle equipped with an active fuel management engine.

BACKGROUND OF THE INVENTION

In recent years, many manufacturers have developed Active Fuel Management (AFM), formerly called Displacement on Demand, systems to improve the fuel economy of internal combustion engines. An AFM engine operates in a normal mode (all cylinders are active) when power above a predetermined threshold is required and in an AFM mode (at least one cylinder is deactivated) when power requirement is reduced. AFM mode produces a higher level of firing force, as a result of increased in-cylinder pressures, for each active cylinder. This higher firing force, in turn, causes torque variations, which produce increased structural vibrations, thereby degrading noise and vibration, N&V, performance. In addition, the AFM mode firing frequency reduces to half of the normal mode firing frequency, resulting in more excitation to structurally sensitive frequency ranges.

In order to cancel engine induced forces, and prevent them from propagating and exciting other structures in the vehicle, various systems have been proposed. One known solution concerns the implementation of passive engine mounts. Conventional passive engine mounts exist in many variations and generally comprise of some combination of mass-spring-damper system optimized to provide dynamic stiffness and isolation at a key vibrational frequency. These systems usually provide less acceptable damping at other frequencies. Therefore, conventional passive approaches of vibration suppression may not meet the N&V requirement for both AFM mode and normal mode of engine operation.

Alternatively, some manufacturers have employed hydraulic-based systems for canceling engine induced forces. An exemplary hydraulic mount assembly presently available combines properties of elastomeric materials with hydraulic fluid, and typically includes a reinforced, hollow rubber body that is closed by a resilient diaphragm so as to form a cavity. The cavity is separated into two chambers by a plate. The chambers are in fluid communication through a relatively large central orifice in the plate. A first or primary chamber is formed between the partition plate and the body. A secondary chamber is formed between the plate and the diaphragm. The conventional hydraulic mount assembly may contain a decoupler positioned in the central orifice of the plate that reciprocates in response to vibrations. The decoupler movements accommodate small volume changes in the two chambers. However, at certain small input vibratory amplitudes and high frequencies, fluid flow between the chambers is substantially avoided and hydraulic damping does not occur. In this manner, the decoupler functions as a passive tuning device. Furthermore, conventional hydraulic-based mounts can be very cumbersome and expensive, as integrated sensors and control hardware must be configured to monitor and respond to the specific frequency of the transmitted force.

Another possible solution to suppress engine induced vibrations is to apply active vibration control systems, wherein an engine mount device includes internal mechanisms to control fluid flow between the chambers in the mount, thus changing dynamic stiffness and other damping characteristics of the mount. In addition, electronic control of the mount is added to be operable to sense vehicle operating conditions, and respond thereto. Generally, active vibration control systems utilize active actuators, such as active engine mounts, to cancel engine induced vibrations, which have a frequency synchronized with the rotational speed of the crankshaft.

One such active engine mount comprises a spring-mass system such as an electromagnetic actuator having an electromagnet and piston. The electromagnetic actuator is electromagnetically driven and operable to generate a neutralizing force in response to forces transmitted to the frame it is mounted on. However, in order to effectively cancel the transmitted or resultant forces, the neutralizing force must be tuned to the amplitude and frequency of the transmitted force. While numerous methods and apparatuses have been developed for generating such a neutralizing force, in all known developments, generating the neutralizing force is achieved independently. That is, independent mechanisms (e.g., additional sensors) are employed in order to tune the frequency of the neutralizing force to the frequency of the resultant forces (which is a function of the rotational speed of the crankshaft). Such independent mechanisms often require expensive and complex control units to effectively cancel engine induced forces.

SUMMARY OF THE INVENTION

The present invention provides an improvement over conventional control systems for active engine mount devices by providing a novel method for counteracting resultant forces transmitted from an engine to a frame of a vehicle. The method includes the steps of: coupling a force-generating apparatus to an output shaft of the engine; and actively generating a pressure pulse that is configured to neutralize the resultant forces, wherein the pressure pulse has a frequency that is a function of the rotational speed of the engine output shaft. The method further includes selectively communicating the pressure pulse to an engine mount assembly, wherein the engine mount assembly is mounted between the engine and frame. The pressure pulse is communicated to a driving member integrated to the engine mount assembly in response to the resultant forces transmitted to the frame. The method further includes applying a counteracting force to the frame via the driving member in order to counteract the resultant forces.

The present invention further provides a force-generating apparatus for carrying out the method of the present invention. The force-generating apparatus comprises a circuit operatively connected to an engine mount assembly, wherein the engine mount assembly is mounted between the engine and frame. Preferably, the circuit is a hydraulic circuit in fluid communication with the engine mount assembly.

In a first embodiment, the hydraulic circuit comprises a pump operatively connected to an engine output shaft via a cam. The pump is configured to actively generate pressure pulses in accordance with cam rotation. In this manner, the pressure pulses are generated as a function of the rotational speed of the output shaft, and thus, have a frequency directly synchronized with engine speed. Furthermore, the pump is configured to selectively communicate the pressure pulses to the engine mount assembly. In response to the resultant forces transmitted to the frame, the pump communicates a pressure pulse to a driving member integrated to the engine mount assembly. Subsequently, the pressurized driving member counteracts the resultant forces by applying a neutralizing force tuned to the rotational speed of the engine.

In a second embodiment, the hydraulic circuit comprises a high pressure pump operatively connected to an output shaft. The high pressure pump is driven by the output shaft to provide a continuous or uninterrupted flow of pressurized hydraulic fluid at a fixed rate, depending upon the needs of the hydraulic circuit. The hydraulic circuit further comprises an on/off valve fluidly connected to the high pressure pump. The on/off valve is operatively connected to the engine output shaft, such that the on/off valve has an energizing frequency that is directly synchronized with the rotational speed of the output shaft. The on/off valve is configured to selectively pressurize the driving member by supplying pressure pulses provided by the high pressure pump to the driving member. In particular, the on/off valve connects the driving member to the hydraulic circuit in response to resultant forces transmitted to the frame. The frequency of the pressure pulses at the driving member is controlled by the frequency of the energizing current to the on/off valve, i.e., the frequency of the pressure pulses is directly synchronized with engine speed. As a result, the driving member effectively counteracts the resultant forces by applying a counteracting force to the frame, wherein the counteracting force has a frequency tuned to the rotational speed of the engine.

A primary advantage served by the embodiments contemplated by the present invention is the automatic nature of generating pressure pulses at frequencies synchronized with engine speed. Additionally, the present invention provides a simple control system for active engine mounts, and eliminates the need for the employment of additional sensors that are conventionally used to independently monitor the frequency of resultant forces transmitted to a body of a vehicle and dynamically tune the frequency of the generated forces.

The above features and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
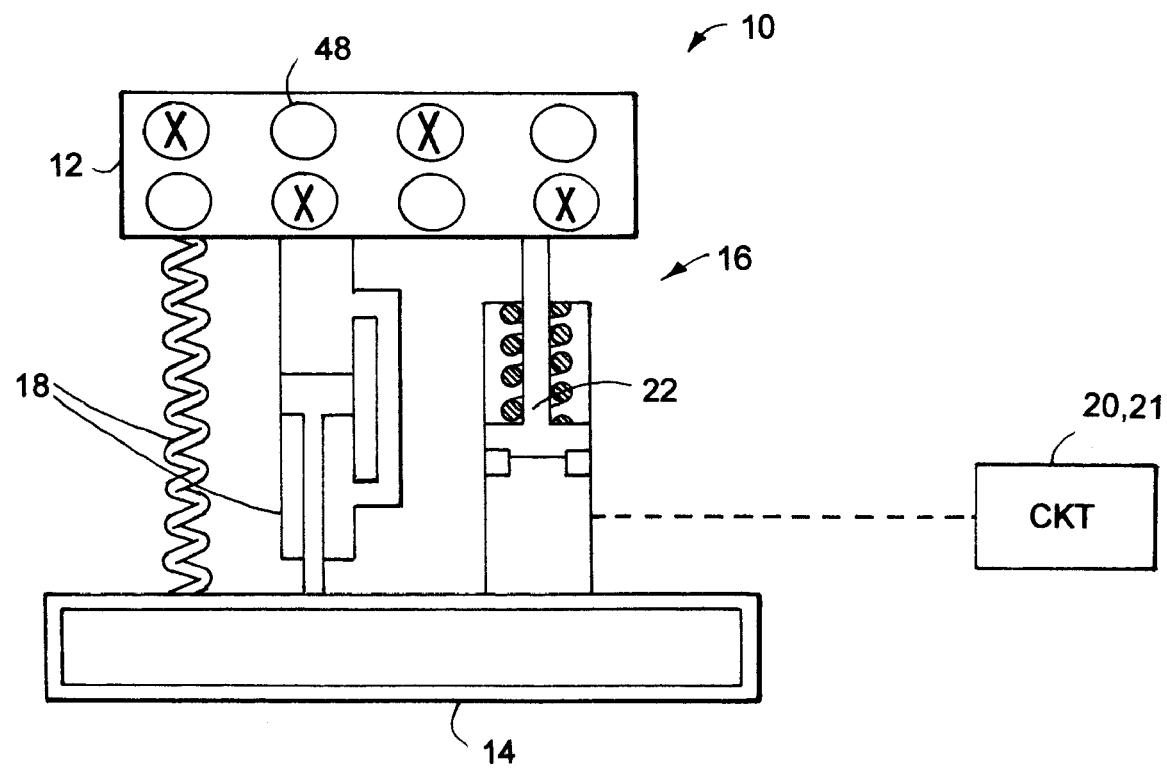
FIG. 1 is a schematic representation of an active engine mount assembly in accordance with present invention.

Referring generally to the drawings, wherein like reference numerals refer to like components throughout the several views, FIG. 1 illustrates a portion of a vehicle 10 having an engine 12 mounted to a body or frame 14 of the vehicle 10. The engine 12 is preferably, but not limited to, an internal combustion engine 12. The internal combustion engine 12 has at least one cam 30 operatively connected to an engine output shaft or crankshaft 28 (both shown schematically in FIGS. 2 and 3). The cam 30 can be connected to the crankshaft via means such as, but not limited to, a driveline chain (not shown) or belt (not shown).

In the preferred embodiment, the internal combustion engine 12 will be a variable displacement engine, or operate in an active fuel management (AFM) mode of operation. Those skilled in the art will recognize that an AFM mode of operation refers to the selective disabling of one or more cylinders 48 during operating modes where the required power of the internal combustion engine 12 is operating below a predetermined value. Although FIG. 1 depicts eight cylinders 48, it will be appreciated that the internal combustion engine 12 may include additional or fewer cylinders 48.

The internal combustion engine 12 is supported on the frame 14 by an active engine mount assembly 16. The active engine mount assembly 16 comprises a damping mechanism, such as, but not limited to a spring-damper unit 18, and a driving member, such as, but not limited to, a rod or ram 22. The active engine mount assembly 16 operates to counteract vibrations imparted to the frame 14 by the internal combustion engine 12. In particular, the active engine mount assembly 16 is operable to generate a counter vibration or counteracting force to cancel vibrations or resultant forces produced by the internal combustion engine 12. Engine induced vibrations have a frequency and an amplitude that change with the rotational speed of an engine crankshaft. Accordingly, since the frequency and the amplitude of the resultant forces change with engine speed, the frequency and the amplitude of the counteracting force must also change with engine speed.

Figure 2:
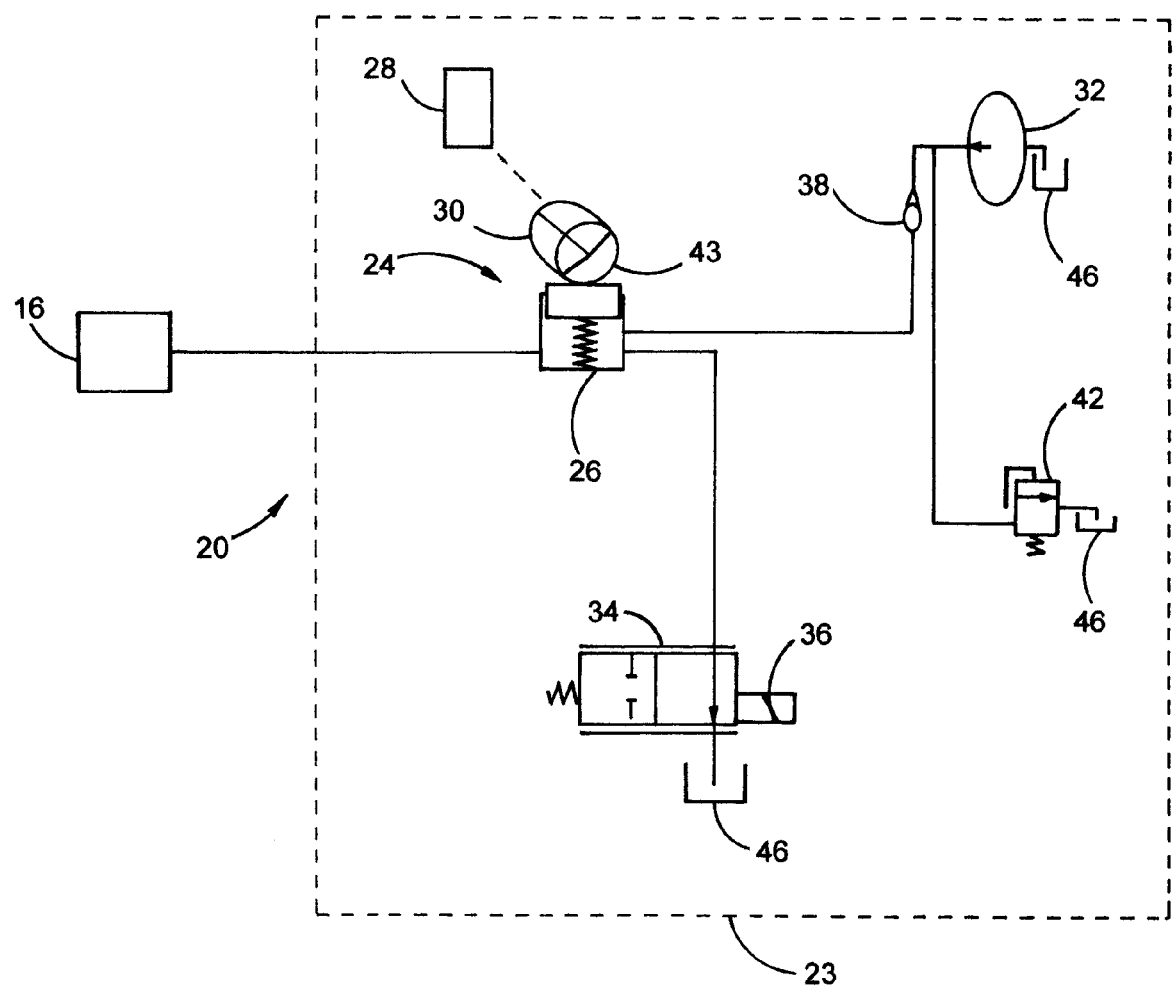
FIG. 2 is a schematic representation of an integrated hydraulic circuit in accordance with one embodiment of the present invention.
Figure 3:
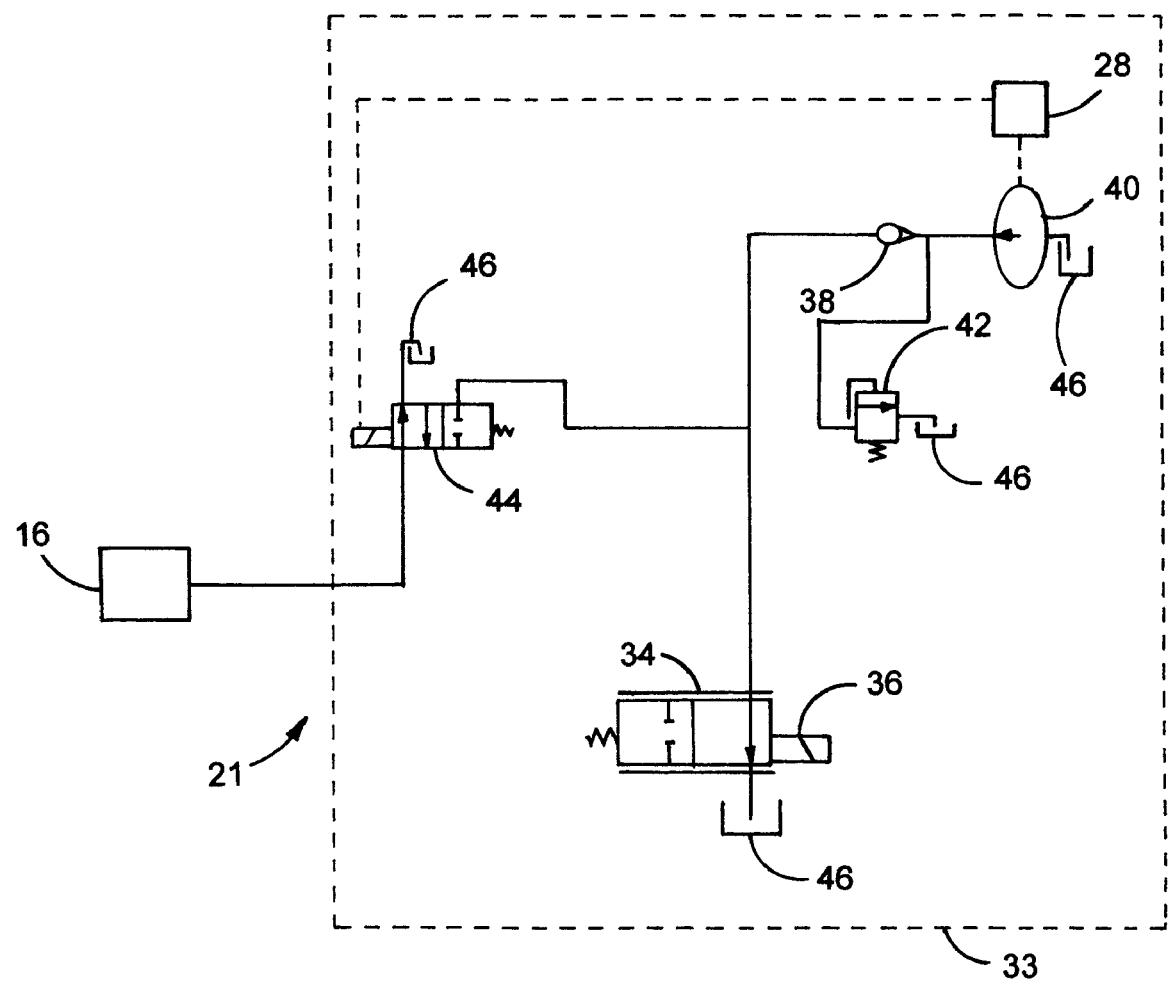
FIG. 3 is a schematic representation of an integrated hydraulic circuit in accordance with another embodiment of the present invention.

In the preferred embodiments, as depicted in FIGS. 2 and 3, the active engine mount assembly 16 is fluidly connected to force-generating apparatuses such as hydraulic circuits 20, 21. (In FIG. 1, the hydraulic circuit 20 is depicted in phantom, and is only schematic, but embodies the hydraulic circuits 20, 21 depicted in FIGS. 2 and 3, respectively). Both hydraulics circuits 20, 21 are respectively, part of integrated hydraulic units 23, 33 feeding pressure pulses to the ram 22 which is integrated with the active engine mount assembly 16. The automated nature of generating the pressure pulses at frequencies that are synchronized with engine speed improves and simplifies active engine mounts in vehicles.

More particularly and referring first to FIG. 2, an exemplary embodiment of the present invention is depicted. The hydraulic circuit 20 comprises a pump such as, but not limited to, a spring biased piston pump 24 having a high pressure chamber 26. The spring biased piston pump 24 is operatively connected to the crankshaft 28 and is operable to pressurize hydraulic fluid drawn from a second pump 32. Preferably, the hydraulic fluid is self-contained within the hydraulic circuit 20 in order to eliminate the need for accessing into other existing circuits within the engine 12. In addition, the spring biased piston pump 24 is driven by the cam 30, wherein the cam 30 is continuously connected to the crankshaft 28. In this manner, the spring biased piston pump 24 is configured to actively generate pressure pulses per cam rotation. Hence, the pressure increases and decreases in accordance with cam position. Furthermore, the spring biased piston pump 24 is configured to selectively communicate pressure pulses to the ram 22.

The hydraulic circuit 20 further includes the second pump 32 in fluid communication with the spring biased piston pump 24. The second pump 32 is operatively connected to a power source (not shown) and operable to refill the high pressure chamber 26 when the pressure is zero, i.e., cam 30 is on the base circle 43. The maximum fluid pressure within the hydraulic circuit 20 is limited by a pressure relief valve 42 fluidly connected to the second pump 32. Preferably, the pressure relief valve 42 is configured to regulate the supply of pressure at a relatively low value.

It should be recognized that FIG. 2 is only a schematic representation and alternate methods of driving pumps are available, including, e.g., an electric motor, and the like.

Similarly, while the second pump 32 is preferably a low-pressure, fixed displacement pump 32, additional pumps known in the art can be employed. Moreover, in order to protect the low-pressure, fixed displacement pump 32 from back flow, the hydraulic circuit 20 comprises a check valve 38 in fluid connection with the low-pressure, fixed displacement pump 32.

The hydraulic circuit 20 further comprises a proportional valve 34 fluidly connected to the spring biased piston pump 24. The proportional valve 34 includes a spool (not shown) for movement therein. The proportional valve 34 is operatively connected to a control module 36 and operable to regulate pressure within the hydraulic circuit 20, wherein the proportional valve 34 is responsive to control signals transmitted from the control module 36. Moreover, the proportional valve 34 is configured to bleed out the hydraulic circuit 20 in order to control the amplitude of the pressure pulses. It should be noted that the proportional valve 34 is modulated in accordance with engine speed, not per engine cycle (i.e., crank rotation), and is configured to yield a certain phasing corresponding to a certain amplitude. More specifically, the proportional valve 34 is passively controlled and modulated only if there is a change in engine speed, and otherwise remains steady so long as engine speed remains steady. In this manner, the proportional valve 34 is configured to ensure that the amplitude of the pressure pulses are tuned to counterbalance the resultant engine forces.

Additionally, the hydraulic circuit 20 further comprises at least one fluid reservoir or sump 46. As illustrated in FIG. 2, the sump 46 is in fluid communication with the proportional valve 34, the low-pressure, fixed displacement pump 32, and the pressure relief valve 42.

The control module 36 controls the operation of the hydraulic circuit 20 based on various vehicle operating parameters and inputs known in the art. In general, the control module 36 is an open loop control system. The control module 36 is operatively connected to sensing devices (not shown) and other output devices to actively monitor and control various aspects of engine and/or vehicle operation. Various control modules may be similarly employed, and necessarily fall within the purview of the present invention. Additionally, as control modules of the sort depicted in FIG. 2 are well known in the art, the control module 36 of the present invention is only detailed herein to the extent necessary to describe its operability.

The control module 36 is configured to check the cylinders 48 in order to determine whether the internal combustion engine 12 is operating in AFM mode. As previously discussed, when the internal combustion engine 12 is operating in AFM mode, resultant forces are transmitted to the frame 14 of the vehicle 10. However, since the frequency and amplitude of the resultant forces change with engine speed, the control module 36 is also configured to command spool position versus engine speed. If the control module 36 determines that the spool is not positioned according to a predetermined position table, the control module 36 will deliver a control signal to the proportional valve 34 in order to displace the spool accordingly.

In operation, the spring biased piston pump 24 actively generates periodic (i.e., per cam rotation) pressure pulses that have a frequency synchronized with engine speed. When the internal combustion engine 12 is operating in AFM mode, the spring biased pump 24 communicates a pressure pulse to the ram 22 in order to cancel the resultant forces transmitted to the frame 14. In turn, the ram 22 is pressurized and applies a counteracting force to the frame, wherein the counteracting force is applied in phase with respect to the resultant forces. Moreover, the counteracting force has a frequency and an amplitude auto tuned to the conditions changing with engine speed. Accordingly, the resultant forces and/or vibrations transmitted from the internal combustion engine 12 to the frame 14 are effectively neutralized, i.e., the net forces transmitted to the frame 14 become zero.

Alternatively, if the control module 36 determines that the internal combustion engine 12 is not operating in AFM mode, then the control module 36 activates the proportional valve 34 to a fully open position (i.e., set to permit full flow) so that the hydraulic pressure fluid is bled out to the sump 46. As a result, the ram 22 will not be pressurized.

It should be noted that while the foregoing embodiment is described as comprising a spring biased piston pump, the present invention nevertheless contemplates various types of pumps that can be implemented to achieve substantially the same outcome. For example, it is within the purview of this invention to utilize a gerotor pump wherein the gear profile is designed such that the gerotor pump actively generates pressure pulses synchronized with engine speed.

Referring now to FIG. 3, a hydraulic circuit 21 in accordance to a second embodiment of the present invention is shown. The hydraulic circuit 21 comprises a solenoid valve 44 operatively connected to the crankshaft 28, such that the solenoid valve 44 is energized via current timing of which is synchronized with rotation of the crankshaft 28. The solenoid valve 44 can be a two-position on/off valve, or any suitable valve known in the art. In addition, the solenoid valve 44 is energized with an on-time frequency that is directly tied to the rotational speed of the crankshaft 28. For example, the frequency of the solenoid valve 44 can be tuned to the crank frequency by utilizing existing spark-timing control methods, or any other suitable method known in the art. Moreover, the solenoid valve 44 receives high pressure hydraulic fluid from a powered fluid source, and is configured to control the supply of pressurized hydraulic fluid to the ram 22. Thus, when the solenoid valve 44 is energized, it operates to pressurize the ram 22 by connecting the ram 22 to the hydraulic circuit 21. The frequency of the pressure pulses at the ram 22 is controlled by the frequency of the on-time of driving current used to energize the solenoid valve 44. During the "off-time" of the driving current, the ram 22 is connected to a sump 46 fluidly connected to the solenoid valve 44. When the solenoid valve 44 is not energized (i.e., when all cylinders 48 are active), it steadily connects the ram 22 to the sump 46.

The powered fluid source is a high pressure pump 40 operatively connected to the crankshaft 28 and operable to actively generate steady high pressure. Preferably, the hydraulic fluid is self-contained within the hydraulic circuit 21 in order to eliminate the need for accessing into other existing circuits within the engine 12. Preferably, the high pressure pump 40 comprises a fixed displacement, low-flow pump. The high pressure pump 40 is configured to maintain a steady level of relatively high pressure in the hydraulic circuit 21. The maximum fluid pressure within the hydraulic circuit 21 is limited by a pressure relief valve 42 fluidly connected to the high pressure pump 40. Furthermore, in order to protect the high pressure pump 40 from back flow, the hydraulic circuit 21 includes a check valve 38 in fluid connection with the high pressure pump 40.

The hydraulic circuit 21 further comprises a proportional valve 34 fluidly connected to the high pressure pump 40 and the solenoid valve 44. The proportional valve 34 includes a spool (not shown) for movement therein. The proportional valve 34 is operatively connected to a control module 36 and operable to regulate pressure within the hydraulic circuit 21, wherein the proportional valve 34 is responsive to control signals submitted from the control module 36. Moreover, the proportional valve 34 is configured to bleed out the hydraulic circuit 21 in order to control the amplitude of the pressure pulses. As in the first embodiment, the proportional valve 34 is modulated in accordance to engine speed, not per engine cycle (i.e., crank rotation), and is configured to yield a certain phasing corresponding to a certain amplitude. That is, the proportional valve 34 is only controlled if there is a change in engine speed, and otherwise remains steady without control so long as engine speed remains constant. In this manner, the proportional valve 34 is configured to ensure that the amplitude of the pressure pulses are tuned to counteract the resultant forces at a given engine speed.

Similar to the first embodiment, the control module 36 is configured to check the cylinders 48 of the internal combustion engine 12 in order to determine whether the internal combustion engine 12 is operating in AFM mode. As previously discussed, when the internal combustion engine 12 is operating in AFM mode, resultant forces are transmitted to the frame 14 of the vehicle 10. However, since the frequency and amplitude of the resultant forces change with engine speed, the control module 36 is configured to change spool position as a function of engine speed. If the control module 36 determines that the spool is not properly positioned according to a predetermined table, the control module 36 will deliver a control signal to the proportional valve 34 in order to displace the spool accordingly. However, if the control module 36 does not detect a change in engine speed, the control module 36 does not transmit a command signal, and the proportional valve 34 is not modulated.

Analogous to the first embodiment depicted in FIG. 2, the hydraulic circuit 21 further comprises at least one fluid reservoir or sump 46. As illustrated in FIG. 3, the sump 46 is in fluid communication with the proportional valve 34, the high pressure pump 40, the pressure relief valve 42, and the solenoid valve 44.

In operation, the high pressure pump 40 actively generates high pressure. In turn, the high pressure pump 40 continuously supplies high pressure to the hydraulic circuit 21, including the solenoid valve 44. In AFM mode, the solenoid valve 44 fluidly connects the ram 22 to the hydraulic circuit 21. The pressure pulses at the ram 22 have a frequency synchronized with the on-time energizing frequency of the solenoid valve 44, which as discussed above, is synchronized to the rotational speed of the crankshaft 28. As such, the solenoid valve 44 effectively communicates a pressure pulse to the ram 22, thereby pressurizing the ram 22 in order to cancel the resultant forces transmitted from the internal combustion engine 12 to the frame 14. In turn, the ram 22 is pressurized and applies a counteracting force to the frame 14. Accordingly, the resultant forces and/or vibrations transmitted from the internal combustion engine 12 to the frame 14 in AFM mode are effectively neutralized, i.e., the net force transmitted to the frame 14 becomes zero.

Alternatively, if the control module 36 determines that the internal combustion engine 12 is not operating in AFM mode, then the control module 36 activates the proportional valve 34 to a fully open position (i.e., set to permit full pressure flow) so that the high pressure fluid is bled out of the hydraulic circuit 21 to the sump 46A. Additionally, since the solenoid valve 44 will not be energized during non-AFM mode, the ram 22 will be connected to the sump 46, and the ram 22 will not be pressurized.

It should be noted that while the embodiments discussed hereinabove are directed to hydraulic circuits, the present invention contemplates use with numerous other systems. Generally, the present invention can be utilized with various types of force-generating mechanisms, wherein the frequency of the generated force is self-tuned to the rotational speed of an engine output shaft. For instance, this invention can be utilized with a mechanism for generating electromagnetic force, wherein the on-time of current is modulated by means directly tuned to the rotational speed of an engine output shaft.

Furthermore, both embodiments, when assembled as integrated hydraulic units 23, 33, may be driven as an accessory from the crankshaft 28.

It is to be understood that the terms "self-synchronized" and "self-tuned" are used throughout this application to refer to the frequency of the generated counter-balancing force. More specifically, the force generating apparatuses 20, 21 of the present invention are configured to have an intrinsic characteristic such that the frequency of the generated force exactly matches the frequency of the engine imbalance force at a given speed. In this manner, when the engine speed changes, the frequency of the imbalance force changes in a predictable way, and the frequency of the generated force also changes, automatically, to match the new frequency of the engine imbalance force. Accordingly, there is no external control for adjusting the frequency of the generated force, i.e., it is intrinsic to the hydro-mechanical or electrical characteristics of each apparatus.

The present invention further provides a method for counteracting resultant forces transmitted from an engine 12 having a rotatable crankshaft 28 to a frame 14 of a motorized vehicle. The method comprises: coupling a force-generating apparatus to a crankshaft 28 of an engine 12 such as, but not limited to, an internal combustion engine 12; actively generating a counteracting pressure pulse sufficient to neutralize the resultant forces; regulating said counteracting pressure pulse in accordance with engine speed; wherein the counteracting pressure pulse has a frequency and amplitude that are functions of engine speed. Preferably, the force-generating apparatus is one of the integrated hydraulic units 23, 33 depicted in FIGS. 1 and 2. However, it should be noted that the force-generating apparatus can alternatively comprise a suitable force-generating mechanism, wherein the frequency of the generated force is directly tuned to the rotational speed of the crankshaft 28.

The method further comprises configuring the force-generating apparatus to selectively communicate the counteracting pressure pulse to a ram 22 integrated to an active engine mount assembly 16. In particular, the force-generating apparatus is configured to pressurize the ram 22 by communicating the pressure pulse to the ram 22 in response to the resultant forces transmitted to the frame 14, wherein the resultant forces are generated by the deactivation of at least one cylinder 48 in the internal combustion engine 12. Preferably, the force-generating apparatus communicates the pressure pulse to the ram 22 by way of a pump (e.g., a cam-driven spring biased pump 24, gerotor pump, etc.) or an on/off valve 44 (e.g., a two-position on/off solenoid valve). Furthermore, the method comprises counteracting the resultant forces by way of the ram 22. More specifically, the pressurized ram 22 applies a counteracting force to the frame 14, wherein the counteracting force is applied opposite in direction with respect to the resultant engine forces. Moreover, the counteracting force has a frequency that is self-synchronized with engine speed, and an amplitude that is controlled as a function of engine speed. Accordingly, the resultant forces and/or vibrations transmitted from the internal combustion engine 12 to the frame 14 are effectively neutralized, i.e., the net force transmitted to the frame 14 becomes zero.

While the best modes for carrying out the invention have been described in detail, those familiar with the art to which this invention relates will recognize various alternative designs and embodiments for practicing the invention within the scope of the appended claims.

The invention claimed is:

1. An engine mount including an integrated ram for a multi-cylinder engine operable on less than the full number of cylinders and at variable engine speed comprising:
    an integrated hydraulic unit integratable with the engine mount and operable to generate pressure pulses at frequencies self-synchronized with said engine speed, wherein said integrated hydraulic unit selectively communicates said pressure pulses to said ram.

2. A force-generating apparatus for counteracting resultant forces transmitted to a frame of a motorized vehicle generated by the deactivation of at least one cylinder in an engine operatively engaged thereto, said force-generating apparatus comprising:
    a hydraulic circuit in fluid communication with an active engine mount assembly, said active engine mount assembly comprising a spring-damper unit and a ram, said active engine mount assembly mounted between the engine and the frame;
    a higher pressure fixed displacement pump operatively connected to a crankshaft of the engine and operable to actively generate and supply high pressure;
    a pressure relief valve fluidly connected to said high pressure fixed displacement pump and operable to regulate pressure within said hydraulic circuit;
    a solenoid valve operatively connected to said engine crankshaft and operable to selectively communicate pressure pulses to said ram, said pressure pulses self-tuned to frequencies synchronized with the rotational speed of said crankshaft;
    a proportional valve fluidly connected to said solenoid valve, said proportional valve operable to regulate amplitude of said pressure pulses in accordance with engine speed;
    wherein communication of said pressure pulses to said ram operates to pressurize said ram in order to counteract the resultant forces transmitted to the frame; and
    wherein said pressurized ram applies a counteracting force to the frame having a frequency that is self-synchronized with engine speed, and an amplitude that is controlled as function of engine speed.

3. An actively controlled engine mount system employing a ram to cancel an oscillatory force transmitted to a frame of a motorized vehicle having a multi-cylinder engine drivable on less than the full number of cylinders, wherein the multi-cylinder engine has a rotatable crankshaft when the multi-cylinder engine is running on less than the full number of cylinders, the actively controlled engine mount system comprising:
    a cam-driven spring-biased higher pressure piston pump having an outlet and a checked intake;
    a fixed displacement lower pressure pump connected to said checked intake of said higher pressure piston pump;
    a proportional valve in a controlled bleed rate relationship with said higher pressure piston pump; and
    a self-contained circuit connecting said higher pressure piston pump, lower pressure pump, and said proportional valve in fluid flow with each other and connectable with said ram;
    wherein said higher pressure piston pump is drivable by a cam rotatable with said crankshaft and configured to provide pulsed pressures of known frequency to said ram;
    wherein said proportional valve is passively controlled, without modulation per engine cycle, to yield a phasing corresponding to a certain amplitude; and
    wherein said higher pressure piston pump includes a higher pressure chamber refillable by said fixed displacement lower pressure pump in accordance with the configuration of said cam.

4. The actively controlled engine mount system of claim 3, wherein said higher pressure piston pump, said fixed displacement lower pressure pump, said proportional valve, and said self-contained circuit are configured as an integrated hydraulic unit.

5. A method for counteracting resultant forces transmitted from an engine, having a rotatable output shaft, to a frame of a motorized vehicle, comprising:
    coupling a force-generating apparatus to the output shaft; and
    actively generating a counteracting pressure pulse sufficient to neutralize the resultant forces;
    wherein said pressure pulse has a frequency that is self-synchronized with the rotational speed of the output shaft.

6. The method of claim 5, further comprising regulating said pressure pulse in accordance with engine speed, wherein said pressure pulse has an amplitude that is controlled as a function of the rotational speed of the output shaft.

7. The method of claim 6, further comprising selectively communicating said pressure pulse to an active engine mount assembly, said active engine mount assembly mounted between the engine and the frame.

8. The method of claim 7, further comprising communicating said pressure pulse to a driving member in response to the resultant forces transmitted to the frame, said driving member integrated within said active engine mount assembly;
    wherein communicating said pressure pulse to said driving member includes pressurizing said driving member.

9. The method of claim 8, further comprising counteracting the resultant forces by way of said pressurized driving member.

10. The method of claim 9, wherein said force-generating apparatus is a hydraulic unit integrated with the active engine mount assembly.

11. The method of claim 10, wherein communicating said pressure pulse to said driving member is by way of a pump.

12. The method of claim 10, wherein communicating said pressure pulse to said driving member is by way of an on/off valve.

13. A force-generating apparatus for counteracting resultant forces transmitted from an engine to a frame of a motorized vehicle comprising:
    a hydraulic circuit in fluid communication with an engine mount assembly, said engine mount assembly mounted between the engine and the frame;
    wherein said hydraulic circuit is operable to actively generate pressure pulses having frequencies self-synchronized with engine speed; and
    wherein said hydraulic circuit is operable to selectively communicate said pressure pulses to said engine mount assembly.

14. The force-generating apparatus of claim 13, wherein said hydraulic circuit includes a portion operatively connected to an output shaft of said engine.

15. The force-generating apparatus of claim 14, wherein said engine mount assembly includes an integrated ram member operatively and fluidly connected to said hydraulic circuit, said ram member operable to receive said pressure pulses.

16. The force-generating apparatus of claim 15, wherein said hydraulic circuit comprises:
   a first pump operatively connected to a power source and operable to supply pressure to said hydraulic circuit; and
   a pressure control mechanism for regulating pressure within said hydraulic circuit, said pressure control mechanism responsive to control signals transmitted from a control module operatively connected to said pressure control mechanism.

17. The force-generating apparatus of claim 16, wherein said pressure control mechanism comprises a proportional valve configured to modulate in response to a change in engine speed; and
   wherein said proportional valve is configured to ensure that the amplitude of said pressure pulses are controlled as a function of engine speed.

18. The force-generating apparatus of claim 17, wherein said hydraulic circuit further comprises a spring biased piston pump having a high pressure chamber refillable via first said pump, said spring biased piston pump operatively connected to said output shaft via a cam directly connected to said output shaft;
   wherein said first pump is a lower pressure fixed displacement pump;
   wherein said spring biased piston pump is configured to generate said pressure pulses in relation to cam rotation;
   wherein said spring biased piston pump is further configured to communicate said pressure pulses to said ram member in response to the resultant forces transmitted to the frame; and
   wherein said ram member is pressurized to counteract the resultant forces with a counteracting force applied opposite in direction with respect to the resultant forces, said counteracting force having a frequency that is self-synchronized with engine speed, and an amplitude that is controlled as a function of engine speed.

19. The force-generating apparatus of claim 17, wherein said first pump is a higher pressure fixed displacement pump operatively connected to said output shaft and operable to provide a continuous flow of said pressure pulses to said hydraulic circuit.

20. The force-generating apparatus of claim 19, wherein said hydraulic circuit further comprises an on/off valve operatively connected to said output shaft, said on/off valve configured to communicate said pressure pulses to said ram member in response to the resultant forces transmitted to the frame;
   wherein said on/off valve has an on-time energizing frequency that is directly synchronized with the rotational speed of the output shaft; and
   wherein said ram member is pressurized to counteract the resultant forces with a counteracting force applied opposite in direction with respect to the resultant forces, said counteracting force having a frequency that is self-synchronized with the rotational speed of said output shaft, and an amplitude that is controlled as a function of engine speed.

* * * * *